A. B. STEVENS.

Assignor of one-half his right to the Hale & Kilburn Manufacturing Co.

CHAIRS.

No. 7,582. Reissued March 27, 1877.

Witnesses
A. Ruppert.
J. G. Mason

A. B. Stevens
Inventor.
D. P. Holloway & Co
Attys

UNITED STATES PATENT OFFICE.

ASHER B. STEVENS, OF PHILADELPHIA, PENNSYLVANIA, ASSIGNOR OF ONE-HALF INTEREST TO THE HALE & KILBURN MANUFACTURING COMPANY, OF SAME PLACE.

IMPROVEMENT IN CHAIRS.

Specification forming part of Letters Patent No. 185,796, dated December 26, 1876; reissue No. 7,582, dated March 27, 1877; application filed February 15, 1877.

*To all whom it may concern:*

Be it known that I, ASHER B. STEVENS, of Philadelphia, in the State of Pennsylvania, have invented a new and useful Improvement in Chairs, of which the following is a specification:

This invention belongs to that class of chairs designed for the use of children, which are convertible at pleasure into a high chair, or into a low chair, or carriage running on wheels, and provided with a swinging table, which may be used as a shelf for the child's playthings, or swing down out of the way, or turned up to form a canopy over the seat, when used out-of-doors as a carriage.

Figure 1:
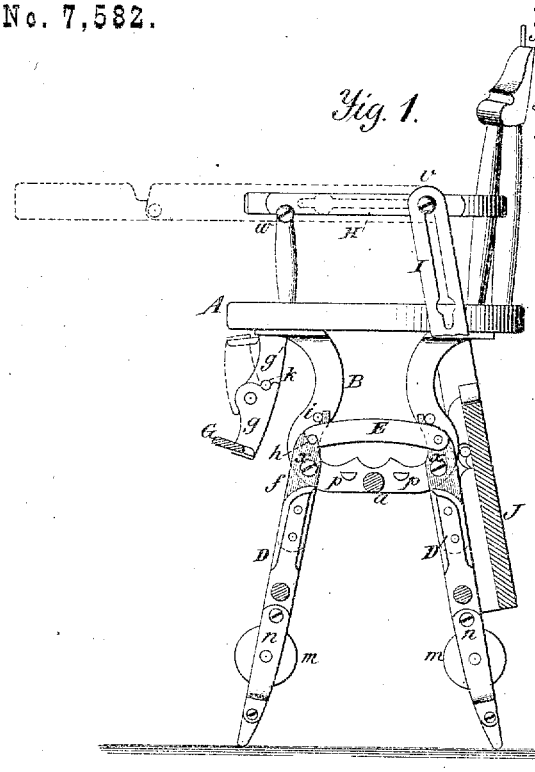
Figure 3:
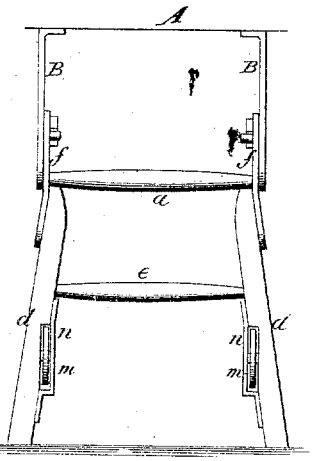
Figure 4:
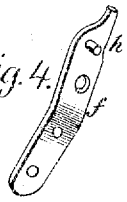
Figure 2:
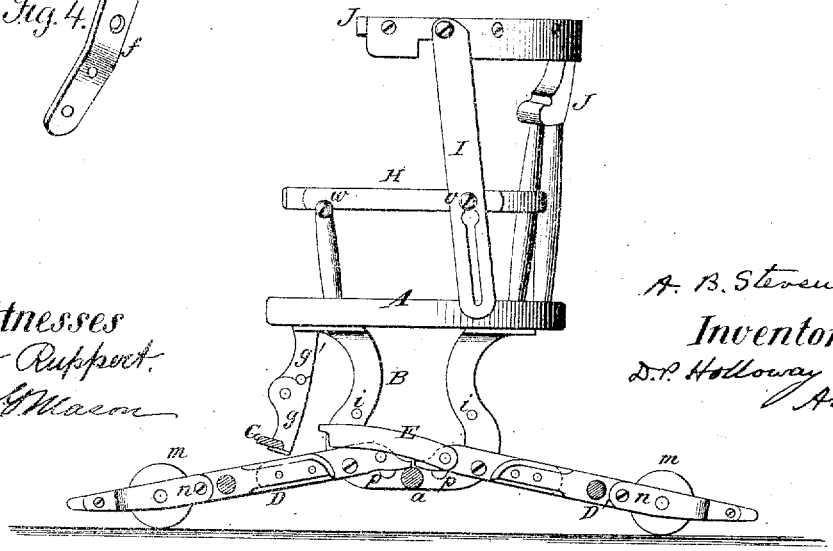

In the annexed drawing, making a part of this specification, Figure 1 is a side elevation of a chair, partly in section. Fig. 2 is an elevation, showing the chair extended, so as to form a low seat or child's carriage. Fig. 3 is a front elevation of one of the pairs of legs; and Fig. 4 is a perspective view, showing the form of that part of the metallic frame to which the legs are attached.

The same letters are employed in all the figures in the indication of identical parts.

To the under side of the seat A of the chair are secured two rigid metallic frames, B, connected together by a cross-bar, *a*, and to these frames the legs D D′ are pivoted. The parts *d d* of the legs are made of wood, and are bolted to metallic plates *f*, connected to the frame B by pivots, (shown at *x*.) It is necessary that the legs D D′ should have an outward inclination to broaden the base of the chair, and when they are extended, as shown in Fig. 2, to form a low seat or carriage, it is indispensable that they should have a diagonal direction, or otherwise the base will be so narrow as to make the carriage liable to be overturned. To effect this broadening of the base the plates *f* are bent so as to permit the legs to be turned freely, and at the same time give them an outward inclination.

By this means I am enabled to use wooden legs approximately straight, and therefore cut with the grain, so as to leave their strength unimpaired. In chairs of this character heretofore known, when the attempt has been made to secure the broadened base it has been done by using crooked legs, which, being cut across the grain, are very insecure.

The legs are secured in their vertical position by the stops *i i*, against which the ends of the plates *f f* above the pivots abut, when the legs are vertical, being held in this position by the swinging brace E, pivoted to one leg-plate, and resting against the other, as shown at *h*, which is a pin to receive a notch or recess on the brace.

By raising the brace, so as to disengage the legs, they may be turned out, as shown in Fig. 2, resting upon the wheels *m* at the outer end, and at the inner end upon the stops *p p* on the frames B, which bear against the plates *f f*. H H are the arms of the chair, to which two headed pins, *w* and *v*, are fastened to secure the table J, which is supported on the slotted bars I by pivots, the pins *v* allowing the table to swing high enough to be carried forward over the child's head, or to rest on top of the chair-back, as shown in Fig. 2, to form a canopy.

The foot-rest G is secured to two leaves, *g g′*, of a hinge, which permit the foot-board to be turned up under the seat, or extended to serve as a rest for the child's feet, stops *k* on the stationary section *g′* holding the swinging section *g*.

What I claim as my invention, and desire to secure by Letters Patent, is—

1. In combination with the chair seat and frames B B, the swinging legs D D′ and adjustable cross-braces E, bearing against the legs, to hold them in their vertical position, substantially as set forth.

2. In combination with the chair seat and frames B B, the swinging legs D D′, and stops *p p*, and wheels *m*, for supporting the seat when lowered to form a carriage, substantially as set forth.

3. In combination with the seat of a chair, and a metallic frame attached to the seat, the curved plates *f*, hinged to the frame, and so bent as to give an outward inclination to the legs attached thereto, and supporting the seat in either position, with a flaring base, substantially as set forth.

4. The combination of the seat and the footboard G and hinges *g g'*, secured to the under side of the seat by the fixed section *g'*, substantially as set forth.

5. In combination with the seat, provided with a back, the table J and slotted arms I I, adjustably attached to the arms H, so that the table may be converted into a canopy, substantially as set forth.

In testimony that I claim the foregoing I have hereunto set my hand this 13th day of February, 1877.

ASHER B. STEVENS.

Witnesses:
R. MASON,
J. G. MASON.